UNITED STATES PATENT OFFICE.

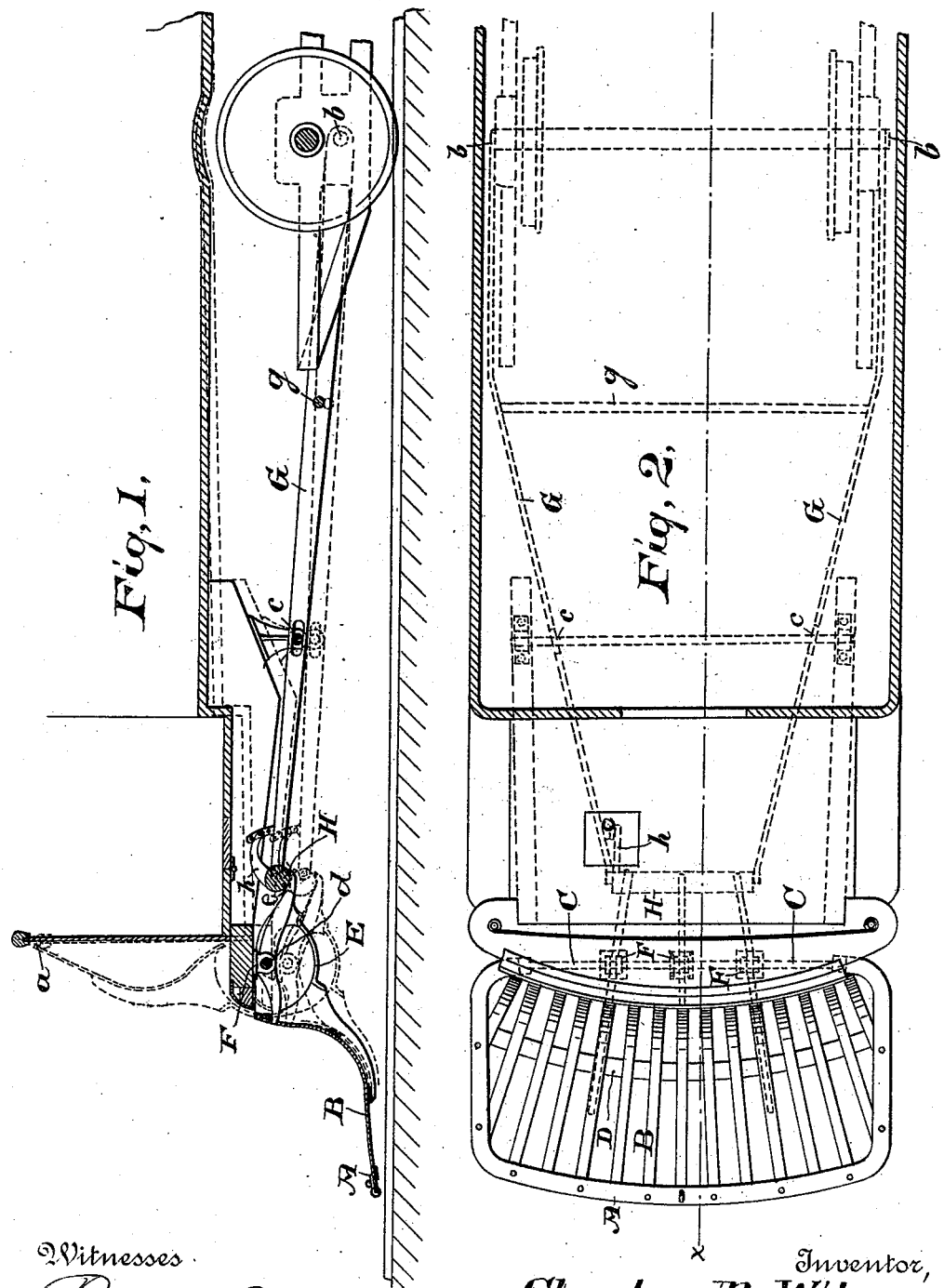

CHARLES M. WILCOX, OF NEWARK, NEW JERSEY.

CAR-FENDER.

SPECIFICATION forming part of Letters Patent No. 553,549, dated January 28, 1896.

Application filed May 17, 1895. Serial No. 549,655. (No model.)

*To all whom it may concern:*

Be it known that I, CHARLES M. WILCOX, a citizen of the United States, residing at Newark, in the county of Essex and State of New Jersey, have invented certain new and useful Improvements in Car-Fenders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a fender for electric, cable and other surface cars, having means connected therewith for automatically holding the front end of the fender in close proximity with the track-rails, and to prevent the rocking motions of the car endwise from being transmitted to the fender, and to secure other advantages and results hereinafter referred to.

The invention consists in the improved fender and in the combination and arrangement of the parts thereof and connected therewith, as hereinafter set forth, and finally pointed out in the claims.

Referring to the accompanying drawings, in which similar letters of reference indicate corresponding parts in each of the figures where they occur, Figure 1 is a vertical longitudinal section taken through line $x$ of Fig. 2, showing in dotted lines the car-body in an abnormal position to the car-truck, the relative position of the fender proper to the track-rails not being changed thereby; and Fig. 2 is a plan view of my improved fender, showing the bottom of the car to which it is secured.

In said drawings, A represents a metallic plate comprising the front and sides of the fender. To said plate are securely fastened metal straps B, extending rearward and upward and secured at their upper ends to a bar C, which connects at its opposite ends with the said plate A at the top just beneath the platform of the car. About midway between the plate A and bar C is another plate, D, which is also secured to the plate A and to the straps B.

To the back of the fender or guard are firmly secured brackets E, C-shaped in their general outlines, and pivotally connected at $d$ with hangers F, which are firmly secured to and beneath the platform of the car, as seen in Fig. 1. This arrangement enables the fender when not in use to be turned upward by the motorman and be secured in front of the dashboard of the car, as will be understood by reference to the dotted lines in Fig. 1, and held in said position by a suitable catch, as indicated at $a$, said brackets E being shaped so as not to interfere with the woodwork or platform of the car when raised in said position, as will be understood. The fender being thus thrown upward readily permits the car to be coupled with another.

In order that the front of the fender or guard when in use may be automatically kept in a uniform relation with the track-rails, I have arranged at each side of the car a lever G, one end of which is pivoted at $b$ to the journal-box or other stationary fixture of the truck and near the opposite end loosely pivoted at $c$, Fig. 1, to the bottom of the car. To the front ends of the said levers G is eccentrically pivoted a cross-bar H, which engages with projections $e$ upon the brackets E, as shown in Fig. 1, so that the front end of the fender will thereby be held in substantially the same relative position to the track-rails, notwithstanding the rocking motion of the car endwise, as is clearly illustrated in Fig. 1. Said cross-bar H carries an arm $h$, by which it can readily be adjusted and locked into any desired position. Said cross-bar being eccentrically pivoted to the rods or levers G acts thus as a cam and allows the fender to be adjusted and held at any desired distance above the track-rails, as will be obvious. A cross-bar $g$, firmly connected with the lever G, assists in bracing the latter.

The fender may be covered with a suitable cushion, canvas or netting to prevent a person from being seriously injured when falling thereupon, as will be understood.

The operation of the mechanism is as follows: When the front of the car in its rocking motion endwise is thrown downward, it will be seen that the said mechanism will be thrown in the position indicated in dotted lines in Fig. 1, thereby preventing the front of the fender from striking the track-rails.

From this the effect of the opposite motion of the same end of the car will be readily comprehended without further description.

Having thus described the invention, what I claim, and wish to secure by Letters Patent of the United States, is—

1. The combination with the front end of the car, of hangers pivotally secured to the under side thereof, a portion of each of which projects to the rear of the pivotal point, a fender secured to the front portion of the hangers, levers pivotally connected at their rear ends with the axle-box or other stationary fixture of the truck-frame and near their front ends loosely pivoted to the car body; a cross bar connected with the front ends of said levers and loosely engaging with the rear portions of the hangers, whereby the front end of the fender is normally held in the same position relative to the track by said levers, but free to be raised up in front of and secured to the dashboard, substantially as set forth.

2. The combination with the car, of curved or substantially C-shaped brackets pivotally secured to the under side of the platform, a fender secured to the front end of said brackets and adapted to be swung up and secured to the dashboard of the car, and a system of levers pivotally connected with the car truck and loosely with said brackets, whereby the front end of the fender is held in the same relative position to the track when the fender is in use, substantially as described, and for the purposes set forth.

3. The combination with the guard or fender, of levers pivotally connecting at one end with the journal boxes or other permanent fixture, of the truck, and near the other end with the platform of the car, a cross bar eccentrically pivoted to the front ends of said levers and loosely engaging with a hinged fender, supporting levers or brackets whereby the rocking motion of the body of the car endwise is prevented from being transmitted to the front of the guard or fender, as described, and for the purposes set forth.

In testimony that I claim the foregoing I have hereunto set my hand this 14th day of May, 1895.

CHARLES M. WILCOX.

Witnesses:
OLIVER DRAKE,
BEATRICE CHARLES.